Patented Sept. 8, 1925.

1,553,112

UNITED STATES PATENT OFFICE.

RURIC C. ROARK, OF BALTIMORE, MARYLAND.

INSECTICIDE.

No Drawing.   Application filed July 16, 1923. Serial No. 651,965.

*To all whom it may concern:*

Be it known that I, RURIC C. ROARK, a citizen of the United States of America, and resident of Baltimore, Baltimore city, State of Maryland, have invented certain new and useful Improvements in and Relating to Insecticides, of which the following is a specification.

This invention relates to arsenical insecticides; and the objects and nature of the invention will be readily understood by those skilled in the art in the light of the following explanation of examples from among others within the spirit and scope of my discovery and invention.

An object of the invention is to produce an arsenical insecticide that will overcome certain disadvantages inherent in insecticides of the arsenical class heretofore proposed, and that will not be destructive to growing vegetation yet will be efficient in the control of chewing insects that infest such vegetation.

Various arsenical compounds have heretofore been suggested for use as insecticides, but certain serious disadvantages attach to all of them. White arsenic $As_2O_3$, for example, is very poisonous to insects but on account of its solubility in water is extremely injurious to vegetation. In solution as sodium arsenite, it is, in fact, used as a very efficient herbicide. Relatively insoluble arsenites such as those of calcium, zinc and copper may be used on hardy plants, such as cabbage and potato but are entirely unsuited for use on orchard trees. For this purpose the arsenates of calcium, iron, magnesium, lead and other bases have been tried but the only arsenates in commercial use as insecticides for orchards are those of lead, and calcium arsenate, to a limited extent for application on apple trees only. Calcium arsenate is extensively employed to control the cotton boll weevil but is not suitable for use on delicate foliage such as that of the peach tree.

I have discovered that arsenic in the elemental state is an effective stomach poison to insects and that owing to its low solubility in water it is not destructive to growing vegetation infested by such insects. Furthermore, arsenic in the elemental state is in a very much more concentrated form than when combined as an arsenite or an arsenate. Thus a great economy in weight, transportation charges, package cost, and the like, is effected through the use as an insecticide of elemental instead of combined arsenic.

My invention involves an insecticide the essential ingredient of which is formed by elemental arsenic.

I prefer to employ elemental arsenic in its metallic form although colloidal or amorphous arsenic is also suitable. Metallic arsenic prepared by the reduction of $As_2O_3$ or by the decomposition of other arsenic compounds is quite suitable for my purpose, and constitutes elemental arsenic within the meaning of my invention, although I now prefer to use metallic arsenic as it occurs in nature. It is not necessary to employ the metallic arsenic in pure form, it may be used together with the rock or ore with which it is associated. For use as an insecticide the metallic arsenic is crushed to convenient size and is then reduced to a fine powder in a suitable puverizing mill. During this pulverization, sand, clay, silica, limestone or other insecticidally inert materials may be added to assist the pulverization. For insecticidal purposes I prefer to use powdered elemental arsenic of such fineness that not less than 90% passes a 200 mesh test sieve.

With regard to the fineness of the powder, in general the finer the powder the quicker and more complete the insecticidal action. A powder which would just pass a 80 or 100 mesh sieve would be effective, but a powder which passes a 200 mesh sieve is very much more effective. It is very difficult to get a powder 100% of which will pass a 200 mesh sieve, but it is possible and practical to obtain one 90% of which will pass a 200 mesh sieve—the other 10% being fine enough to pass a 100 mesh sieve. I would say that 100 mesh would be as coarse as the powder should be used. There is no limit on the fineness except the mechanical one of obtaining it.

For use as an insecticide this pulverized elemental or metallic arsenic may be applied in the same way that lead arsenate and other arsenical insecticides are now applied. My insecticide may be applied to vegetation either by dusting or spraying. It may be mixed with sulphur or Bordeaux mixture to form a combined insecticide and fungicide or it may be added to nicotine solution or other standard insecticides to form a combination spray. Either the pure elemental or metallic arsenic, or the arsenic to which sand, etc., has been added during the grinding process, or the native arsenic associated with rock and other impurities may be used in these ways.

In all cases the dosage is based on the content of elemental arsenic, which percentage or content, appears on the package or container or is otherwise made known to the user.

Elemental or free arsenic herein referred to is arsenic in the elemental, elementary or uncombined form, represented by the symbol As. Combined arsenic differs from uncombined or free arsenic in that it is chemically combined with some other element. For example arsenic, As, and oxygen O, combine to form arsenious oxide, the symbol for which is $As_2O_3$.

Elemental or free arsenic may exist in at least three forms—namely; as metallic arsenic (which may be native, or that which occurs in nature as ore, or which may be prepared artificially by the reduction of arsenic compounds in the laboratory); secondly as yellow arsenic, and thirdly as black arsenic. Yellow and black arsenic are allotropic forms of the ordinary or metallic arsenic.

My invention deals primarily with metallic arsenic as it occurs in nature, although the metallic arsenic prepared in the laboratory is equally efficient.

What I claim is:—

1. An insecticide embodying free arsenic reduced to a powder of such fineness that not less than approximately 90% passes a 200 mesh test sieve.

2. An insecticide embodying as its essential ingredient elemental arsenic (As) in the free state, reduced to powdered form of a fineness suitable for dusting or spraying purposes.

3. An insecticide containing elemental arsenic reduced to a powdered form of a fineness suitable for dusting or spraying purposes.

4. An insecticide containing elemental arsenic reduced to a powdered form of a fineness so that approximately 90 per cent. will pass through a substantially 100 mesh test sieve.

Signed at Baltimore, Baltimore city, State of Maryland, this 11th day of July, 1923.

RURIC C. ROARK.